Aug. 26, 1947.   R. C. NEWHOUSE   2,426,232
DISTANCE MEASURING SYSTEM
Filed Feb. 5, 1944
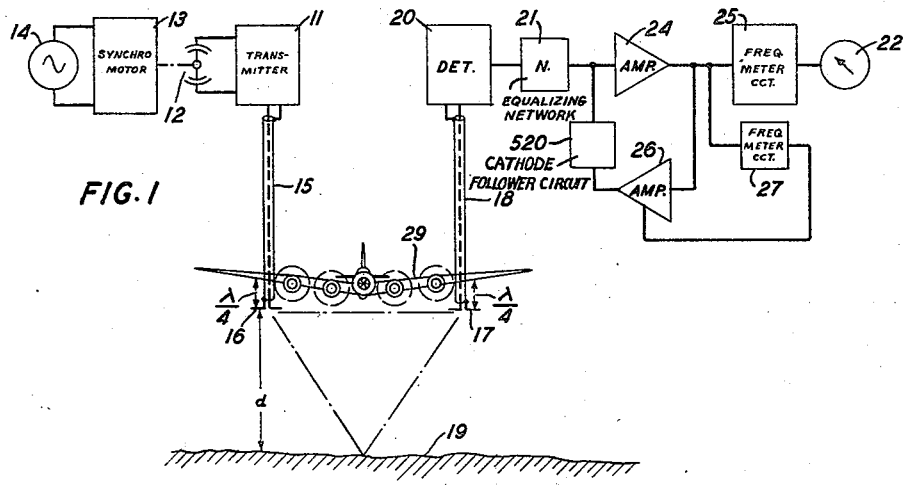
FIG. I
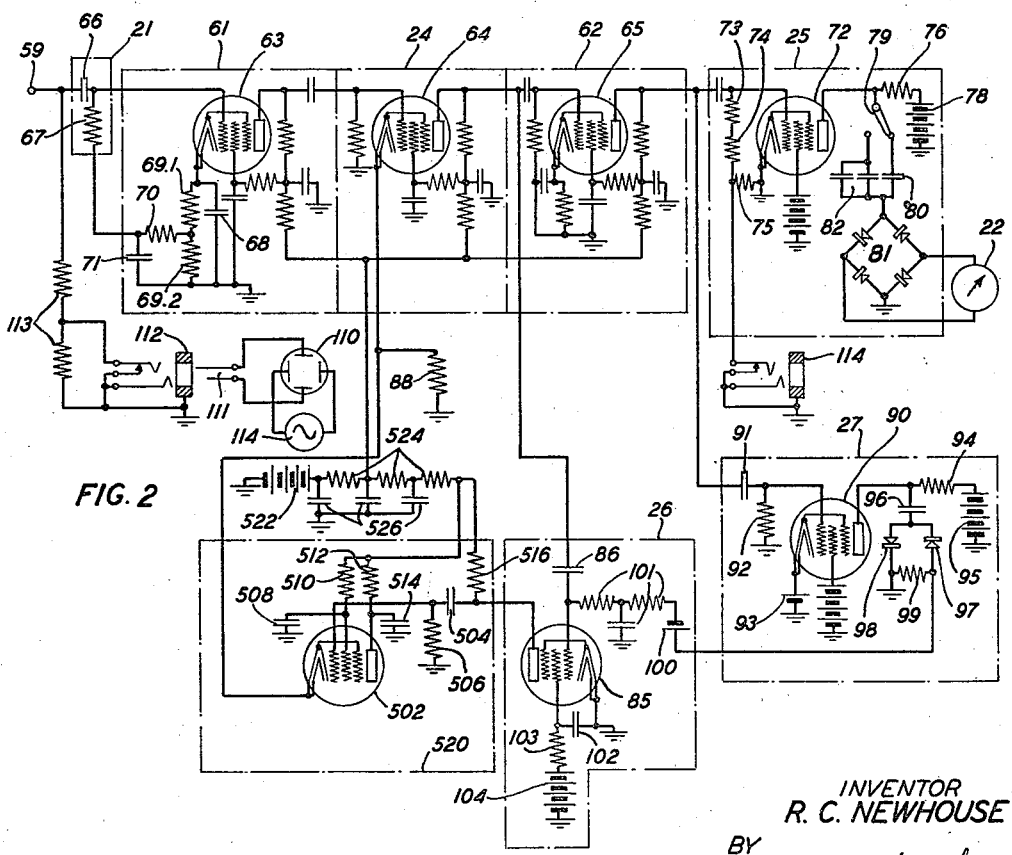
FIG. 2
INVENTOR
R. C. NEWHOUSE
BY H. O. Wright
ATTORNEY Patented Aug. 26, 1947

2,426,232

UNITED STATES PATENT OFFICE 2,426,232

DISTANCE MEASURING SYSTEM

Russell C. Newhouse, Millburn, N. J., assignor to Bell Telephone Laboratories, Incorporated, New York, N. Y., a corporation of New York Application February 5, 1944, Serial No. 521,173

3 Claims. (Cl. 250—1.68)

This invention relates to systems for measuring distances by the use of radiant energy and particularly to such systems as are adapted for use as altimeters or terrain clearance indicators for aircraft.

More specifically, the invention relates to an improvement in the feedback circuit employed in the amplifier and frequency measuring portion of the receiver of the radiant energy distance measuring system disclosed and described in detail in U. S. Patent 2,206,903 issued July 9, 1940, to R. F. Lane and the present applicant jointly. The principal object of the invention is to improve the accuracy and reliability of the distance measurements particularly as the distances being measured become relatively quite small.

In accordance with the above-mentioned patent and with this invention, distance is measured by radiating waves from one point to another and receiving the waves reflected back to the first point. The time interval between radiation and reception is a measure of the distance and is determined by cyclically varying the frequency of the transmitted waves at a known rate and over a known range. The frequency difference between the wave being transmitted and the received reflected wave is therefore a measure of the distance to the reflecting surface. The measurements are obtained by beating together a portion of the transmitted wave and the echo wave and measuring the frequency of the resultant difference frequency beat wave.

As a result, the accuracy of the system is, of course, dependent upon the accuracy of the frequency measurement. This is true not only with respect to the absolute measurement of the beat frequency wave but also with respect to the elimination from that measurement of any substantial effect of currents of spurious frequencies. Such currents arise not only from such usual causes as circuit noise, vibration, power supply variations, harmonic production and the like but also from causes peculiar to the system itself. For example, amplitude modulation of the echo may be produced by variation in the reflecting power of the terrain or by interference between component echoes from adjacent surfaces of different height or distance. Unless precautions are taken to eliminate such spurious frequencies quite false and misleading indications may be obtained.

The general principles of operation of the distance measuring systems with which the arrangements of the invention are intended to be used are discussed in detail in the above-mentioned patent.

In the above-mentioned patent it is also taught that the majority of the above-described difficulties can be substantially eliminated by giving the receiver-amplifier a frequency gain characteristic which rises with frequency and by providing means responsive to the particular beat frequency being measured to limit the amplifier gain at frequencies higher than this particular beat frequency. This means of limiting the gain at higher frequencies comprises a feedback circuit which is described in detail in the above patent. The arrangements described in the patent have been found to be satisfactory over the greater portion of the range of altitudes or frequencies normally of interest in the navigation of aircraft.

However, at relatively low altitudes the arrangements of the patent have been found to be less accurate and reliable than might be desirable, particularly for landing operations. This invention is therefore directed to a modification of the feedback circuit controlling the amplifier gain of systems of the type described in the above patent by which the accuracy and reliability of the system may be increased at relatively low altitudes.

With reference to Fig. 2 of the accompanying drawing and Fig. 5 of the above-mentioned patent, vacuum tube 64 is used in a conventional form of resistance coupled amplifier circuit with constants so proportioned that the gain is substantially of constant value for all frequencies up to the highest frequency of interest. The vacuum tube 85 is used in a feedback circuit which applies the amplified output of tube 64 to the cathode circuit of the latter tube in the proper phase to reduce its output. The time constant of the coupling circuit including capacitor 504 and resistor 506 of the feedback circuit of Fig. 2 or of network 23 of Fig. 5 of the patent, is chosen so that the maximum gain in the feedback circuit occurs at the highest frequency which is desired to have full gain through stage 24. This results in the feedback circuit reducing the effective gain at high frequencies more than at low frequencies, the reduction in effective gain falling off at the rate of 6 decibels per octave below the point at which the resistance is equal to the reactance of the coupling circuit. Thus the alternating current voltage across resistor 88 is controlled to provide a reduction in the effective gain which is substantially proportional to the average frequency of the signal being amplified in tube 64, and tube 85 is cut off for high frequency signals but becomes operative to reduce the gain when the signal frequency is lower and gain at the higher frequencies is unnecessary and detrimental.

Referring again to Fig. 2 of the accompanying drawing and Fig. 5 of the above-mentioned joint patent, amplifier stages 24 and 26 constitute, respectively, a stage of the receiver-amplifier and a stage of the feedback circuit amplifier associated therewith. At high frequencies the reactances of the coupling circuit capacitors 86 and 504 of Fig. 2 or 86 and 87 of Fig. 5 of the patent are small as compared with the values of their respective associated resistors and the phase shift through the interstage coupling circuits is therefore negligible. The phase shift through the feedback circuit at high frequencies is therefore only that of the vacuum tube 85 which phase shift is 180 degrees. Vacuum tube circuit 520 of the present invention introduces no phase shift as will be explained hereinafter.

The operation of the circuit loop including vacuum tubes 64 and 85 is, at high frequencies, therefore, as follows. A positive signal on the grid of tube 64 causes an increase in the anode circuit current of the tube which flows through the cathode circuit resistor 88 and makes the cathode of tube 64 more positive. At the same time the anode of tube 64 becomes less positive (or more negative). This causes the control grid circuit of tube 85 to become less positive (or more negative) at the same instant, since there is negligible phase shift and therefore negligible time delay in the circuit coupling the anode of tube 64 and the control grid of tube 85. The anode circuit current of tube 85 is therefore reduced and the anode of tube 85 becomes more positive which raises the potential of the cathode of tube 64, either directly, as in the circuit of the patent, or through circuit 520 of the present invention, and tends to reduce the anode circuit current thereof and the gain of stage 24, as desired for normal operation of the complete circuit. As the frequency of the signal current is reduced, however, the reactances of the coupling circuit capacitors 86 and 504 of Fig. 2 or 86 and 87 of Fig. 5 of the patent increase and at the lower end of the frequency range become appreciable as compared with the values of their respective associated resistors. At the lower extreme (i. e., zero frequency) the phase shift of each coupling circuit becomes 90 degrees so that the total phase shift of the feedback circuit becomes 360 degrees and the feedback, instead of being negative, is positive at zero frequency. Fortunately, in the circuits of the patent and of the present invention, the net loss around the feedback loop is so high at zero frequency and at lower frequencies that "singing" or oscillation cannot take place. A limitation in using the original circuit (shown in Fig. 5 of the patent) arises from the fact that the cathode resistor 88 associated with tube 64 cannot be made large enough to be a satisfactory load at the lower end of the beat-note frequency range for tube 85 without being too large to permit satisfactory gain to be realized in tube 64. Additional gain at lower frequencies cannot conveniently be obtained by the seemingly obvious expedient of adding a second stage of straightforward amplification in the feedback path since this would involve the introduction of yet another interstage coupling network which would add still more phase shift (reaching a maximum value of 90 degrees additional at zero frequency) in the feedback path with the result that the "singing" (or oscillation) frequency would be moved substantially upward in frequency from zero frequency and instability of the overall circuit, comprising amplifier stage 24 and the new 2 stage feedback circuit, would then be encountered at some low frequency point well within the range of frequencies employed in the operation of the system. The fundamental principles are, of course, well known in the art and are, for example, explained at length in an article by H. Nyquist, entitled "Regeneration Theory," published in the Bell System Technical Journal, volume XI, 1932, at pages 126 to 147.

To avoid the limitations described in detail above, this invention provides for the necessary additional gain at lower frequencies by interposing between the feedback stage 26, Fig. 2 of the accompanying drawings, and the cathode resistor 88 of the amplifier stage 24, a special vacuum tube circuit 520 which increases the effective gain of the feedback stage 26 at lower frequencies by presenting at the output of stage 26 a suitably high impedance. The output of stage 26 is then stepped down (in impedance) by circuit 520 so that it can be connected across cathode resistor 88 without causing any substantial impedance irregularity at that point. The circuit 520 is of the well-known form designated in the art as a cathode-follower and introduces substantially no phase shift so that the original stability of the feedback circuit throughout the entire utilized range of frequencies is not disturbed. Capacitor 504 and resistor 506 which couple tube 502 to tube 85 can then present the desired higher impedance to tube 85 and at the same time provide the feedback circuit with an attenuation-frequency characteristic which is substantially the same as that of network 21 of the main path of the amplifier. With respect to this latter function capacitor 504 and resistor 506 take the place of network 23 of Fig. 5 of the patent as intimated above.

The principles and nature of the invention will be more readily understood in connection with the following detailed description taken in conjunction with the accompanying drawing in which:

Fig. 1 shows in block schematic diagram form an altimeter system for aircraft of the type in connection with which the principles of the invention may be advantageously employed; and Fig. 2 shows in electrical circuit schematic diagram form, the application of the principles of the invention to the feedback circuit of an amplifier, suitable for use in the system illustrated in Fig. 1.

In more detail, in Fig. 1 the system comprises an ultra-short wave radio transmitter 11 equipped with a rotating condenser 12 driven by a synchronous motor 13 for continuously varying the frequency of the transmitter. The output of the transmitter is connected through a coaxial transmission line 15 to a half wave dipole antenna 16 which is mounted a quarter wave length below the metal surface of the wing of the airplane 29 upon which the system is carried, the wing surface of the airplane acting as a reflector.

A second similar half wave dipole antenna 17, mounted in axial alignment with the antenna 16 is connected through a concentric transmission line 18 to a detector 20. As indicated in the diagram, the waves generated by the transmitter 11 and radiated by the antenna 16 will be directly transmitted to the antenna 17 and also transmitted thereto by reflection from the surface of the earth 19 or other objects, the distance of which it is desired to measure. The directly transmitted and reflected signal components are applied to the detector 20 where they combine to produce a useful demodulation product which is a signal whose instantaneous frequency is equal to the instantaneous difference in the frequency of the two component waves. This difference frequency product is amplified and its frequency is measured and indicated by the frequency meter circuit 25, which is of the integrating type, and the meter 22. The average value of the frequency difference is a direct measure of the altitude, that is, the distance $d$ between the measuring apparatus and the reflecting surface 19.

The circuit for amplifying the frequency difference product includes the equalizing or attenuating network 21 and amplifier 24 which is provided with an inverse feedback circuit including vacuum tube circuits 26 and 52C. The feedback amplifier 26 is provided with a control through an auxiliary frequency meter circuit 27. The operation and functions of these various amplifiers and control circuits will be described in detail in connection with Fig. 2 which is a detailed electrical circuit schematic thereof.

The general principles of operation and the detailed description with appropriate illustrative diagrams and circuits are given for the other apparatus units of the system in my above-mentioned joint patent.

*Amplifier and frequency measuring circuit*

Fig. 2 shows a detailed electrical schematic circuit of the amplifier and frequency measuring circuit of the radio receiver portion of the apparatus of Fig. 1. This circuit is similar to that indicated in the block schematic of Fig. 1 and, in general, the same reference numerals are used for corresponding parts. There are shown, however, three amplifier stages 61, 24 and 62 while in the block schematic of Fig. 1 the amplifier is indicated generally by the single block 24.

As discussed above, and in my above-mentioned joint patent, the function of the amplifier circuit is to amplify the beat frequency output of the detector 20 which comprises waves, for example, of frequencies varying between 160 cycles and 40,000 cycles per second and to give an indication of the frequency thereof. The latter function is performed by the frequency meter or counter circuit 25 and the associated meter 22.

When the equipment is operating at higher altitudes it has been found that there will be present, in addition to the difference frequencies representing the altitude, other lower frequencies primarily produced by amplitude modulation of the echo wave resulting from terrain irregularities and secondarily by amplitude modulation of the transmitter by noise and by other disturbing phenomena. Unless the effect of said frequencies is substantially eliminated, the frequency meter will not give a true indication of the height, or altitude, of the aircraft above the ground surface 19. It is, therefore, necessary to provide means for attenuating frequencies lower than the frequency representing the height or altitude. Thus, for example, if the aircraft is flying at 5,000 feet and the detector output signal is 40,000 cycles, it is desirable to attenuate frequencies below 40,000 cycles as much as it is conveniently possible. This is accomplished by giving the amplifier a frequency gain characteristic which rises with frequency. It is possible to do this because the strength of the received echoes at the lower frequencies will normally be greater than at higher frequencies since the lower frequencies represent shorter paths (lower altitudes) for the echo transmission.

When the amplifier is given such a sloping frequency-gain characteristic, other difficulties are introduced in the operation of the system at lower altitudes where the frequency difference to be measured is in the lower frequency range. In such cases the increased amplification at higher frequencies may introduce distortion from undesired higher frequencies which may result from the generation of harmonics of the desired signal, amplitude modulation of the echo by irregularities of the terrain as the aircraft flies therealong and other miscellaneous causes. It is consequently necessary to provide means operative in the lower frequency range for limiting the degree of amplification of higher frequencies. This is accomplished by means of an automatically controlled feedback circuit as will be described presently in detail.

The output of the detector circuit containing the beat frequency wave which changes in frequency, in a typical example, from 160 cycles to 40,000 cycles as the altitude of the aircraft changes from 20 feet to 5,000 feet, is supplied to the amplifier through the connection 59. The main amplifier, as shown in Fig. 2, comprises three stages 61, 24, and 62, employing pentode vacuum tube amplifiers 63, 64 and 65, respectively. The tubes are provided with conventional circuits for supplying screen and anode voltages and are coupled together through resistance-capacity circuits of the usual type. Two series-connected resistors 69.1 and 69.2 shunted by a by-pass condenser 68 are provided in the cathode circuit of tube 63. This circuit provides negative feedback as will be described later. In addition the direct current voltage drop across resistor 69.1 is used for grid bias, being applied to the grid through the resistance-capacity filter 70, 71.

In the input to the first stage 61 there is provided an attenuating network 21 comprising the series condenser 66 and shunt resistor 67 as shown in Fig. 2. The values of this condenser and resistor are so chosen that in combination with the cathode resistors 69.1 and 69.2 and the by-pass condenser 68 of the first amplifier tube 63, the maximum signal transmission occurs at some higher frequency, for example, at a frequency well above 20,000 cycles. For each decrease of one octave in frequency below 20,000 cycles, approximately 6 decibels additional attenuation of the signal is produced by the action of this network 21 in combination with the negative feedback action of the above-mentioned cathode resistor condenser network.

By utilizing the negative feedback action of the cathode resistor 69.1, 69.2, and by-pass condenser 68 in combination with the network 21, instead of the latter alone, for obtaining the desired frequency-gain characteristic of the amplifier, additional discrimination against noise is obtained. The reason for this is that in any multistage amplifier, the chief source of circuit noise is the first amplifier stage. Since the negative feedback in the first amplifier tube decreases the gain of that tube at low frequencies, in which range most of the circuit noise lies, considerable discrimination against such disturbances is obtained.

The output of tube 63 is connected through a conventional resistance-capacity circuit to the input of the second amplifier tube 64 which is in turn coupled through a similar circuit to the input of the third amplifier tube 65. The circuit for the latter two tubes are so designed that their respective stages provide substantially uniform amplification up to at least 40,000 cycles per second. The output of the amplifier tube 65 is connected to the frequency meter circuit 25.

The frequency meter circuit comprises a pentode tube 72, the grid circuit of which includes grid leak resistors 73, 74 and 75. The plate of tube 72 is connected through a resistor 76, which may be of about 20,000 ohms, to the constant voltage source 78. Between the plate and cathode of the tube 72, there is connected through the switch 79, a series circuit consisting of the condenser 80, and a bridge type rectifier 81. A milliammeter 22 is connected across the remaining terminals of the bridge.

Starting at a time when no signal is applied to the grid of the tube 72, the internal resistance from plate to cathode of the tube is extremely low compared to the resistance of the resistor 76 so that the plate is practically at the same voltage as the cathode and the condenser 80 is discharged. If there is applied to the grid of tube 72 an alternating current voltage, the negative peak of which is sufficient to cut off the plate circuit, the condenser 80 charges from the battery 78 through resistor 76. Provided the time the tube is blocked is long enough in comparison with the time constant of the condenser and resistance, the condenser 80 will fully charge to the voltage of the battery 78. The circuit is designed for this operation with respect to the current, the frequency of which is to be measured.

During the succeeding positive swing of the excitation applied to the grid of the tube 72, the condenser 80 is discharged to practically zero voltage. Since the action of the rectifier 81 causes both the charging and discharging current of the condenser to flow through the meter 22 in the same direction, a positive deflection occurs on meter 22. A frequency of N cycles per second applied to the grid of the tube 72 causes a current equal approximately to 2NCE amperes to flow through the meter, where C is the capacity of the condenser in farads, and E is the plate supply voltage. Thus it will be seen that the rectified current and consequently the meter deflection will be proportional to the frequency of the exciting oscillations applied to the grid of tube 72 and independent of their amplitudes.

An auxiliary condenser 82 is provided which may be connected in circuit in place of the condenser 80 by means of the switch 79. This provides means for obtaining a different scale reading on the meter 22. For example, if the condenser 80 were 100 micro-microfarads, this combination with a resistance of 20,000 ohms for the resistor 76, would provide a practically linear scale up to 40,000 cycles which corresponds to 5,000 feet. With a capacity for the condenser 82 of 500 micro-microfarads, the time constant of the circuit would be suitable for a maximum frequency of 8,000 cycles which corresponds to 1,000 feet. Thus the use of switch 79 in connection with the two condenser circuits permits the use of the full deflection of the meter 22 for two different scale ranges of height.

The degenerative feedback circuit comprising amplifier stage 26 and vacuum tube circuit 520 functions in the following manner.

Blocking condenser 86 serves to couple the grid of pentode 85 with the output, or anode, circuit of amplifier stage 24. The coupling circuit comprising series capacitor 504 and shunt resistor 506 serves to couple the anode circuit of vacuum tube 85 with the control grid circuit of vacuum tube 502. The coupling circuit 504, 506 serves both to present a high impedance over the entire used range of frequencies so that the gain of tube 85 is maintained substantially constant throughout that entire frequency range and also provides an attenuation in the feedback path which varies with frequency in the same manner as that provided by network 21 of the main amplifier. With respect to this latter function, as mentioned above, the combination 504, 506 takes the place of network 23 of Fig. 5 of my above-mentioned joint patent. As a result of this arrangement the feedback circuit can be made to effectively compensate for the sloping characteristic of the main path amplifier so that the combination of main and feedback amplifier paths can provide an overall amplifier system, the amplification of which is substantially constant with frequency. The point at which the feedback amplifier will become effective to produce such a result will depend upon the amount of gain in the feedback path. Since, as discussed above, it is desirable that the amplifier have less gain for frequencies below the frequency representing the height being measured, it is likewise desirable that the feedback amplifier be only effective to flatten out the overall gain characteristic of the main amplifier stage 24 for frequencies above the frequency representing the height being measured. In order to accomplish this end, the amplification of amplifier 26 and circuit 520 is controlled in accordance with frequency.

For this purpose there is provided an auxiliary frequency metering circuit 27 which in general design and principle of operation is similar to the main frequency meter circuit 25. This circuit comprises a pentode vacuum tube 90 which has its grid connected in parallel with the grid of the tube 72 through the blocking condenser 91. The grid is connected to the cathode through a grid leak resistor 92 and a negative biasing battery 93. The plate circuit of the tube 90 comprises a resistor 94 connected in series with the plate battery 95 and in parallel therewith from the plate to the cathode a series circuit comprising a condenser 96, two half wave rectifiers 97 and 98 and the resistor 99.

This circuit operates in the same way as the frequency meter circuit 25 and the rectifiers 97 and 98 are so connected that the voltage drop across the resistor 99 is negative with respect to ground. The negative voltage developed across the resistor 99 plus an additional negative voltage supplied by battery 100 is applied to the control grid of the tube 85 through the resistance-capacity filter 101. Since the voltage drop across resistor 99 is proportional to the frequency impressed on the grid of the tube 90, the control bias supplied to the control grid of the tube 85 will also be proportional to frequency. As a result the amount of degenerative feedback provided by amplifier 26 and circuit 520 is made to decrease with frequency.

The overall effect of the ciruit arrangement just described is in general similar to that illustrated by the characteristic curves shown in Fig. 6 of my above-mentioned joint patent. However, the addition of the circuit 520 substantially increases the effectiveness and reliability of the feedback arrangement at lower heights without any sacrifice in the operational characteristics at the higher end of the frequency range. By way of example, systems of the present invention provide substantially more accurate and reliable altitude indications below 100 feet than systems of my above-mentioned joint patent. The value of the system as an aid in landing aircraft is substantially increased thereby.

In circuit 520 resistors 510, 512 and 516 serve to isolate their respective circuits from each other while permitting them to obtain suitable operating voltage from the common potential source 522 through the filtering circuit which comprises series resistors 524 and shunt capacitors 526. Capacitors 508 and 514 by-pass higher frequencies which might otherwise cause interference in the battery potential supply circuit of source 522. The remaining portions of the altimeter system of Fig. 1 may be precisely as described for the system employed for purposes of illustration in my above-mentioned joint patent.

Numerous other arrangements embodying the principles of the present invention can be readily devised by those skilled in the art. The invention is defined in the following claims.

What is claimed is:

1. In combination with a distance determining system including means for receiving a plurality of frequencies and for obtaining a wave having a frequency representing the distance being determined, a first means connected thereto for attenuating frequencies below that of the wave and amplifying said wave, means controlled by the first means for obtaining a first voltage having an amplitude representing the first-mentioned frequency, a circuit including a second amplifying means coupled in feedback relation with said first means, said second amplifying means including means in the output thereof for increasing the effectiveness of said second amplifying means at low frequencies without increasing the phase shift thereof, and means for introducing the said first voltage into the gain control circuit of said second amplifying means to control the feedback action of said second amplifying means at frequencies above that of said distance representing wave.

2. In a system for determining distance between an object and a reflecting surface, a first means at said object for transmitting to said surface a radiant energy wave having a continuously varying frequency, a second means at said object for simultaneously receiving said wave after reflection from the surface and a wave directly propagated from the first means to the second means, means for obtaining from said waves a current having a frequency representing the distance, means for amplifying said current and regulating means controlled in accordance with the frequency of said current for regulating the response of the amplifying means to other frequencies, said regulating means including a feedback path comprising an input amplifier stage and an output circuit, the output circuit including means to preserve substantially uniform impedance relations between the amplifier stage and the output of the feedback path over the entire frequency range of interest and more especially at the lower frequencies of said range whereby the effective gain of said feedback path at the lower frequencies is increased without increasing the phase-shift thereof and the effectiveness of the system at short distances is substantially increased.

3. In a system for measuring the altitude of an aircraft above the surface of the earth, a radio transmitter on said object for transmitting waves to the earth, means for cyclically varying the frequency of the waves transmitted thereby, means on said object for receiving said waves after reflection from the earth and simultaneously receiving waves directly from said transmitter, means for combining the reflected waves and the direct waves to produce a beat frequency wave, means for amplifying the beat frequency wave, said last-stated means having a response directly proportional to frequency for at least a portion of the range of frequencies to be amplified, means for obtaining an indication proportional to the frequency of the wave being amplified, a degenerative feedback path operatively coupled to said amplifier means and having a transmission characteristic directly proportional to frequency, means responsive to the frequency of the wave being amplified for controlling the transmission of said feedback path in inverse proportion to the frequency of said wave throughout at least a portion of the range of frequencies to be amplified, said feedback path including an input amplifier stage and an output circuit having substantially no phase shift, said output circuit including a cathode follower vacuum tube circuit and substantially eliminating impedance irregularities between the feedback circuit and said first and second stated amplifying means over a broad range of frequencies whereby adequate and substantially uniform gain is provided in said feedback path without increasing the phase shift thereof and more accurate and reliable indications are obtained especially at lower frequencies.

RUSSELL C. NEWHOUSE.

REFERENCES CITED

The following references are of record in the file of this patent:

UNITED STATES PATENTS

| Number | Name | Date |
|---|---|---|
| 2,206,903 | Lane et al. | July 9, 1940 |